United States Patent
Dietz

(10) Patent No.: US 9,053,599 B2
(45) Date of Patent: Jun. 9, 2015

(54) ADJUSTING APPARATUS FOR SELF-SERVICE DEVICES AND ADJUSTING METHOD

(71) Applicant: WINCOR NIXDORF INTERNATIONAL GMBH, Paderborn (DE)

(72) Inventor: Oliver Dietz, Borchen (DE)

(73) Assignee: WINCOR NIXDORF INTERNATIONAL GMBH, Paderborn (DE)

( * ) Notice: Subject to any disclaimer, the term of this patent is extended or adjusted under 35 U.S.C. 154(b) by 0 days.

(21) Appl. No.: 14/226,084

(22) Filed: Mar. 26, 2014

(65) Prior Publication Data

US 2014/0291111 A1 Oct. 2, 2014

(30) Foreign Application Priority Data

Mar. 27, 2013 (EP) .................................... 13161341

(51) Int. Cl.
*G07F 1/04* (2006.01)
*B65G 41/00* (2006.01)
*B65G 21/12* (2006.01)
*G07F 9/10* (2006.01)
*G07D 11/00* (2006.01)

(52) U.S. Cl.
CPC ................. *G07F 1/04* (2013.01); *B65G 41/003* (2013.01); *B65G 21/12* (2013.01); *G07F 9/10* (2013.01); *G07D 11/0003* (2013.01)

(58) Field of Classification Search
CPC ........... G07F 9/00; G07F 9/10; G07F 19/205; G07D 11/0021; G07D 2211/00; B65G 21/00; B65G 21/12; B65G 21/2045; B65G 21/2054; B65G 21/2063; B65G 21/2072; B65G 41/003; B65G 41/005

USPC ......... 194/344, 350; 198/860.1, 860.2, 861.1; 312/198; 221/282; 271/3.2, 162, 164, 271/253

See application file for complete search history.

(56) References Cited

U.S. PATENT DOCUMENTS

| 4,530,200 | A | * | 7/1985 | Prewer ............................ 53/157 |
| 5,222,626 | A | | 6/1993 | Reinschmidt et al. |
| 5,660,383 | A | * | 8/1997 | Ueffinger et al. ............ 271/3.18 |
| 7,152,784 | B2 | | 12/2006 | Douglass et al. |
| 2013/0175756 | A1 | | 7/2013 | Gawel et al. |

FOREIGN PATENT DOCUMENTS

| DE | 40 39 396 | 6/1992 |
| EP | 2 423 888 | 8/2010 |
| WO | 2011/020904 | 2/2011 |

OTHER PUBLICATIONS

European Search Report of Sep. 10, 2013, (7 pages).

* cited by examiner

*Primary Examiner* — Mark Beauchaine
(74) *Attorney, Agent, or Firm* — Gerald E. Hespos; Michael J. Porco; Matthew T. Hespos

(57) ABSTRACT

An apparatus is provided for adjusting an installation position of modules in a self-service device that has a first module, a second module and a transfer module with a transfer slot for transferring notes of pecuniary value from the first module to the second module or vice versa. The transfer module is held in an operating position by a fastening device and forms a spacing to the second module. An adjusting mechanism is associated with the transfer module so that the transfer module, by forming different spacing to the second module, is mounted so as to be adjustable in an adjusting direction that extends perpendicularly with respect to the transfer slot and in a transfer plane of the notes of pecuniary value which is predefined by the transfer slot.

17 Claims, 4 Drawing Sheets

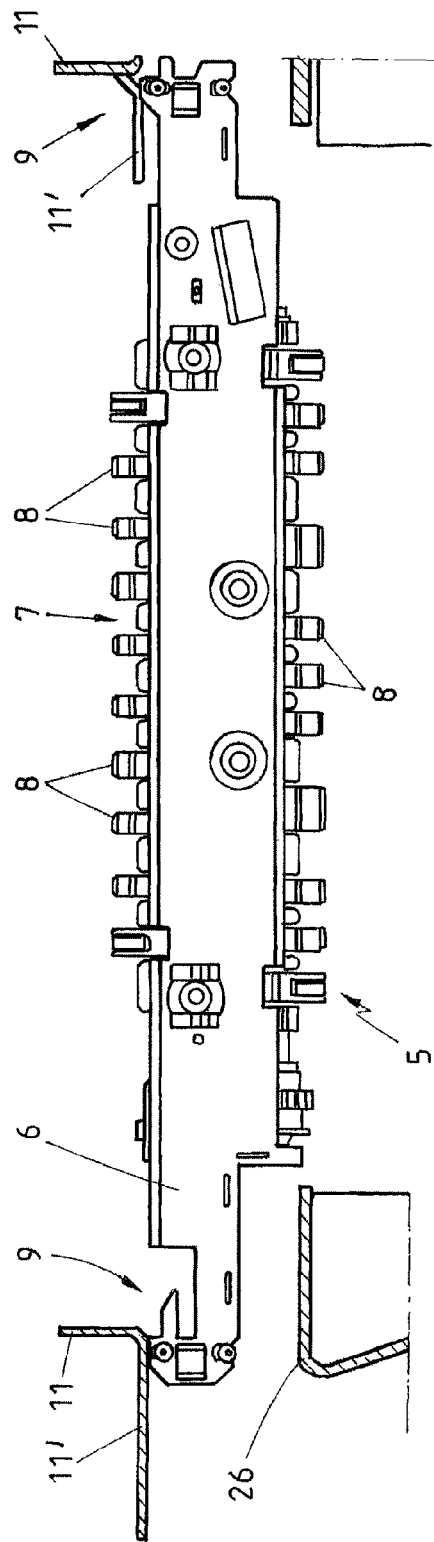
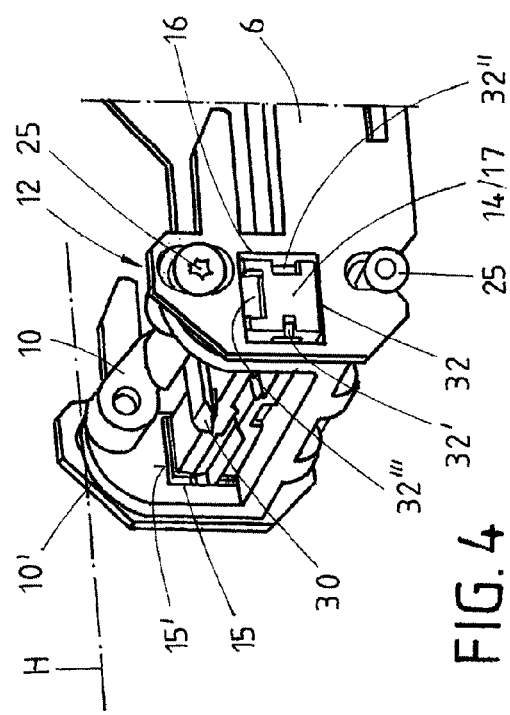

ADJUSTING APPARATUS FOR SELF-SERVICE DEVICES AND ADJUSTING METHOD

BACKGROUND

1. Field of the Invention

The invention relates to an apparatus for adjusting an installation position of modules in a self-service device which comprises as modules a first module, a second module and a transfer module with a transfer slot for transferring notes of pecuniary value from the first module to the second module or vice versa, wherein the transfer module is held in an operating position by means of fastening means and forms a spacing to the second module.

2. Description of the Related Art

In addition, the invention relates to a method for adjusting an installation position of modules in a self-service device, wherein a transfer module is provided for transferring notes of pecuniary value from a first module to a second module of a self-service device or vice versa.

A self-service device, namely an automatic teller machine consisting of several operating modules, is known, for example, from WO 2011/020904 A1. The automatic teller machine comprises as first module a head module for the input and/or output of notes of pecuniary value and as second module a safe for accommodating several cash boxes. A transfer module, which includes a transfer slot and guide means, is provided for transferring the notes of pecuniary value from the first module to the second module or vice versa. To convey the notes of pecuniary value in a reliable manner it is desirable that the spacing between the transfer module, on the one hand, and the first module and/or the second module, on the other hand, is as small as possible so that in particular heavily used, crumpled notes of pecuniary value do not result in the transport path becoming blocked and consequently in the failure of the automatic teller machine. The plurality of components which are operatively connected together in the modules results in a tolerance chain which can lead to an inadmissibly large spacing in particular between the second module and the transfer module. In particular when the second module is designed to drive conveying shafts of the transfer module such that there is consequently a toothed wheel connection between the transfer module and the second module, if the toothed wheels are not correctly engaged wear can occur which impairs the way in which the notes of pecuniary value behave during conveying. As a result of this, it is known when setting up automatic teller machines to align the second module relative to the transfer module in the vertical and horizontal direction until the predefined required spacing range between the transfer unit and the second module is achieved. However, this is linked to relatively high amount of expenditure on adjustment.

Consequently, it is the object of the invention to provide an apparatus and a method for adjusting an installation position of modules in a self-service device in such a manner that the amount of expenditure on adjustment and production is reduced in a simple manner.

SUMMARY OF THE INVENTION

The invention relates to an apparatus for adjusting an installation position of modules in a self-service device. The apparatus has a first module, a second module and a transfer module with a transfer slot for transferring notes of pecuniary value from the first module to the second module or vice versa. The transfer module is held in an operating position by a fastening means and forms a spacing to the second module. An adjusting means is associated with the transfer module in such a manner that the transfer module, by forming different spacing to the second module, is mounted so as to be adjustable in an adjusting direction which extends perpendicularly with respect to the transfer slot and in a transfer plane of the notes of pecuniary value which is predefined by the transfer slot.

The particular advantage of the apparatus according to the invention is that the adjusting means is arranged in a manner restricted to the range of a transfer module. As a result of simple adjustment of the adjusting means, different spacings between the transfer module and the second module can easily be adjusted such that the set spacing then lies within a required spacing range.

According to a preferred embodiment of the invention, an adjusting bolt and a recess into which the adjusting bolt engages are provided as the adjusting means. The adjusting bolt and/or the recess comprise such an adjusting contouring that, in dependence on the relative position of the adjusting bolt to a transfer module, different adjusting positions of the transfer module relative to the second module are settable. To compensate for tolerance deviations of the components built in the second module, it is possible to select an adjusting contouring such that an alignment of the transfer module to the adjacent module can be effected by forming a spacing between the same within the required spacing range.

According to a preferred embodiment of the invention, the adjusting bolt comprises adjusting contours which are arranged in the circumferential direction at a different radial spacing to an axis of the adjusting bolt. By rotating the adjusting bolt, adjusting contours can consequently be "selected". To set up or to service the self-service device, the fitter, after ascertaining the current spacing, can select the suitable adjusting contour of the adjusting bolt and then insert the adjusting bolt into coinciding openings of the transfer module and of a bearing means attached to the second or first module, the selected adjusting contour bringing about a relative displacement of the bearing means to the transfer module.

According to a further development of the invention, the adjusting bolt comprises indicating elements on an end face for coding the adjusting contours such that a fitter is able to ascertain simply the spacing between adjusting positions currently set between the modules and is able to select simply a suitable adjusting contour in dependence on the spacing check. The adjusting operation can be accelerated in an advantageous manner as a result of this.

According to a further development of the invention, the adjusting bolt is mounted transversely with respect to the adjusting direction in openings in a bearing part which is fixedly coupled with the second module and in the transfer module. The adjusting bolt can be removed simply in the axial direction out of the openings which are arranged in alignment with one another and in a certain position of rotation can be inserted in the same again.

According to a further development of the invention, the adjusting bolt is secured in the axial direction by means of a latching element which comprises a clamping force which is brought about transversely with respect to the axis of the adjusting bolt.

According to a further development of the invention, the bearing means comprises a barb-shaped latching element for engaging behind a framework part in the operating position. Said latching element is secured in the clamping position by means of a displacement element of the transfer module. The installation position of the transfer module is unequivocally secured in this manner.

According to an alternative embodiment of the apparatus, the adjusting contouring can also be formed as a result of a stepped design of a longitudinal recess of the transfer module. In conjunction with an adjusting bolt, which is coupled fixedly with a bearing means and engages in the longitudinal recess, a latching means is formed which enables, for example, a vertical alignment of the transfer module to the second or first module. In an advantageous manner, the adjusting bolt does not have to be removed to adjust the spacing between the adjacent modules. By exerting an adjusting force, which acts on the transfer module, in the direction of the longitudinal recess, the desired installation position of the transfer module can be adjusted rapidly.

The invention also relates to a method for adjusting an installation position of modules in a self-service device. A transfer module is provided for transferring notes of pecuniary value from a first module to a second module of the self-service device or vice versa. The method uses an adjusting means to adjust a relative spacing between the transfer module, on the one hand, and the first module and/or a bearing means which is connectable in a positionally fixed manner to the second module, on the other hand. The adjustment is carried out in a adjusting direction in such a manner that the spacing between the transfer module in its installation position and the first module and/or the second module is smaller than a predefined maximum spacing.

The particular advantage of the method according to the invention consists in that the installation position of the transfer module can be adjusted simply in one direction by adjusting an adjusting means which cooperates with a transfer module, the spacing of the transfer module to the adjacent module lying within the required spacing range.

BRIEF DESCRIPTION OF THE DRAWINGS

FIG. 3 shows a detailed front view of the transfer module in its installation position.

FIG. 4 shows a perspective representation of the transfer module in an end region of the same in which a bearing part is fastened on the transfer module.

DETAILED DESCRIPTION OF THE PREFERRED EMBODIMENTS

Figure 1:
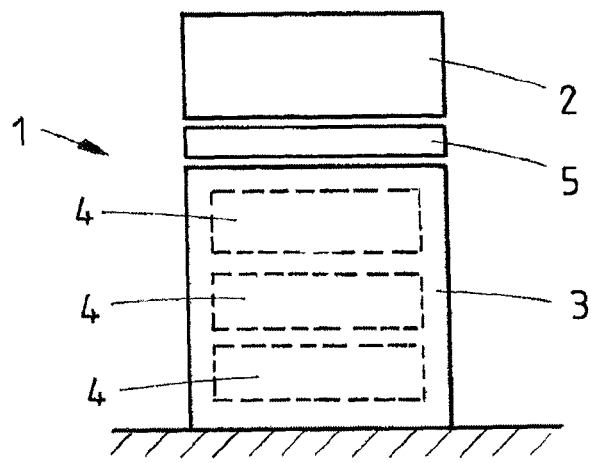
FIG. 1 shows a side view of a self-service device with a top first module, a bottom second module and a transfer module which is arranged between the first module and the second module.
Figure 2:
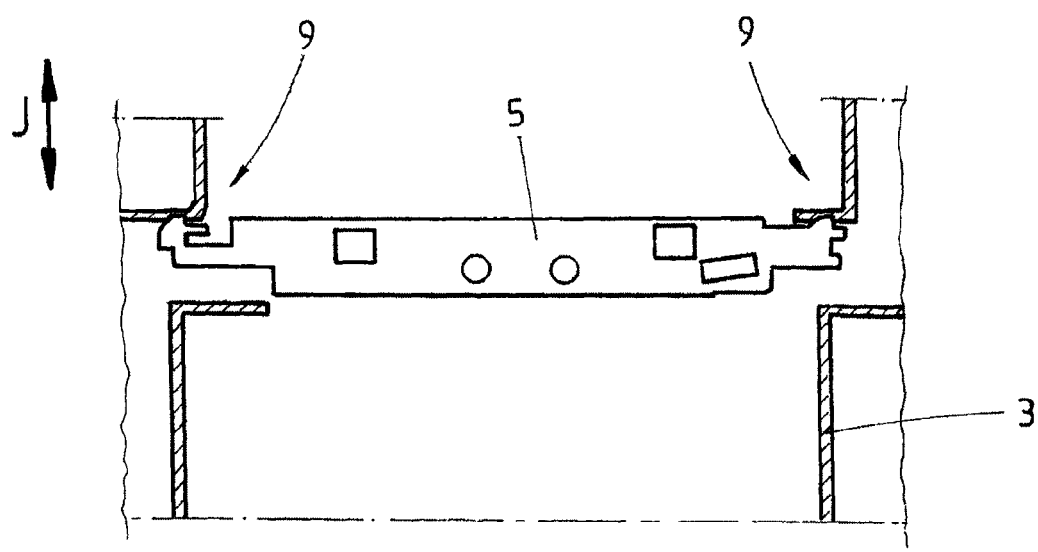
FIG. 2 shows a side view of the self-service device in which the transfer module is suspended on fastening walls of the second module in an installation position.

The invention can be applied to self-service devices, such as, for example, automatic teller machines, cash deposit machines or the like where notes of pecuniary value are to be conveyed from a first module to a second module, the modules preferably comprising different functions.

In the present exemplary embodiment an automatic teller machine 1 is provided as a self-service device which comprises essentially a first module 2 for the input and/or output of notes of pecuniary value (bank notes) and a second module 3 which is arranged in the vertical direction below the first module for accommodating a multitude of cash boxes 4. The first module 2 is realized as a head module, whilst the second module 3 is realized as a safe. A transfer module 5, which is arranged essentially between the head module 2 and the safe 3, is provided for transferring the notes of pecuniary value from the head module 2 to the safe 3 or vice versa.

The transfer module 5 is realized in a bar-shaped manner and comprises upright housing walls 6 which form a frame for a transfer slot 7 which extends in the longitudinal direction of the transfer module 5. A multitude of finger-shaped guide elements 8 are arranged on both sides of the transfer slot 7 so that the notes of pecuniary value are guided through the transfer slot 7 in the direction of a vertical transfer plane.

In an operating position, the transfer module 5 is held or mounted on a fastening wall 11, which is connected fixedly to the safe 3, in each case by means of bearing means 10, which is connected in an end region 9 of the transfer module 5 to said transfer module. As bearing means 10 there is provided a bearing part, which is releasably connected to the housing wall 6 of the transfer module 5 by means of a screw connection 12 and comprises on a top surface 13 a clamping face 10', which interacts with a holding element protruding from the fastening wall 11 such that the bearing part 10, with the clamping face 10' abutting against a horizontal portion 11' of the fastening wall 11, sits in a clamping manner. The transfer module 5 is arranged horizontally in the installation position, the clamping faces 10' which extend in the opposite end regions 9 spanning a horizontal plane H.

So that a regular transfer of the notes of pecuniary value from the head module 2 to the safe 3 or vice versa is guaranteed, the transfer module 5 must only be arranged within a predefined required spacing range to the safe 3. In the present exemplary embodiment, the safe 3 serves as reference. As an alternative to this, it is obviously also possible to fix a maximum required spacing to the head module 2.

To adjust a spacing between the transfer module 5 and the safe 3 vertically (vertical direction), an adjusting bolt 14 is provided in each case as adjusting means on the end regions 9 (bearing points) of the transfer module 5, said adjusting bolt by way of its opposite end regions in each case penetrating an opening 15 in the bearing part 10 and engaging in an opening 16 in the housing wall 6. A first circumferential region 18 of the adjusting bolt 14 connecting directly to an end face 17 of the same is realized in a substantially square manner with four longitudinal sides 20 such that said adjusting bolt by abutting against an edge 16' of the opening 16 sits with play in the opening 16 of the housing wall 6. A second circumferential portion 19 of the adjusting bolt 14, which comprises elevation flank 21, 21', 21'' which extend at a different height to the longitudinal sides 20 of the adjusting bolt 14 in the first circumferential portion 18, connects in the axial direction on a side of the first circumferential portion 18 remote from the end face 17. Said elevation flanks comprise a different elevation relative to the axially adjacent contour of the first circumferential portion 18 or to an axis A of the adjusting bolt 14.

The elevation flanks 21, 21', 21" form fixedly predefined adjusting contours, by means of which the bearing part 10 can be adjusted in the vertically direction relative to the transfer module 5 or its housing wall 6. The second circumferential portion 19 is consequently realized as an elevation ring which, in the present exemplary embodiment, is able to bring about different adjusting positions of the transfer module 5 to the safe 3. A first adjusting contour 22 of the elevation ring does not comprise any radial spacing relative to the axially adjacent longitudinal side 20 of the first circumferential portion 18. If said adjusting contour 22 is to be active, the adjusting bolt 14 is situated in a position of rotation in which said adjusting contour 22 is arranged vertically upward. The adjusting contour 22 abuts against the top opening edge 15' of the bearing part 10, the longitudinal side 20 in the first circumferential portion 18 abuts against the opening edge 16' of the transfer module 5. The two opening edges 15', 16' of the bearing part 10 or of the transfer module 5 consequently extend in the same horizontal plane.

Further elevation flanks 21, 21', 21" of different height to the longitudinal sides 20 of the first circumferential portion 18 serving in each case as a reference, connect in the circumferential direction to the adjusting contour 22 in the second circumferential portion 19. A first elevation flank 21 comprises an adjusting contour 22' which comprises a spacing of a1=0.4 mm to the longitudinal side 20. A second elevation flank 21' comprises an adjusting contour 22" which is arranged at a spacing of a2=0.8 mm to the longitudinal side 20 of the adjacent first circumferential portion 18. A third elevation flank 21" comprises an adjusting contour 22''' which is arranged at a spacing a3=1.2 mm to the longitudinal side 20 of the adjacent first circumferential portion 18.

Figures 5A, 5B:
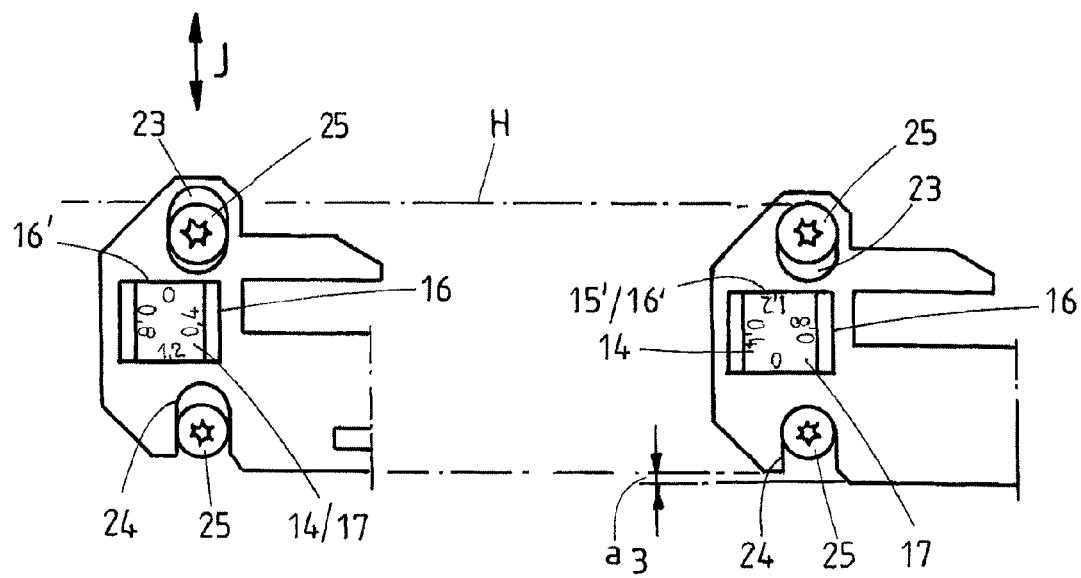
FIG. 5a shows a part view of the transfer module in a top adjusting position.
FIG. 5b shows a part view of the transfer module in a bottom adjusting position.
Figure 6:
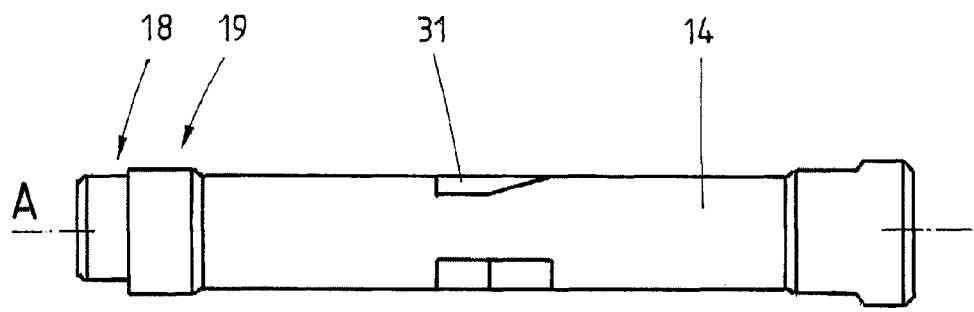
FIG. 6 shows a side view of an adjusting bolt with an adjusting contouring, it being possible to push said adjusting bolt through openings in the transfer module and in a bearing part.
Figure 7:
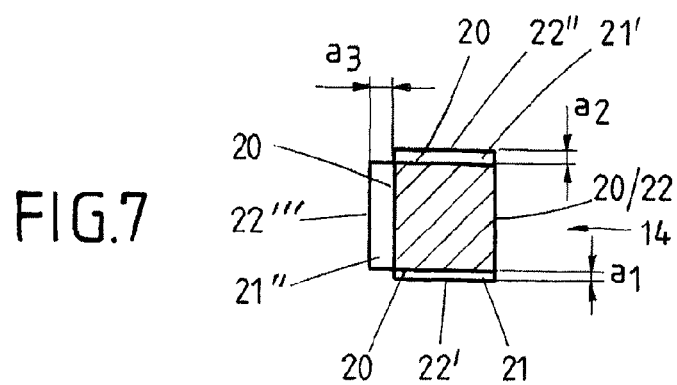
FIG. 7 shows an end view of the adjusting bolt with different adjusting contourings associated in each case with the longitudinal sides.

The longitudinal sides 20 in the first circumferential region 18 form a reference edge for adjusting or setting the relative position between the transfer module 5 and the safe 3 in a stepped manner. If the adjusting bolt 14, engaging in the openings 15 in the bearing part 10 and the opening 16 in the housing wall 6, is inserted, for example, in such a position of rotation that the third adjusting face 21''' is arranged upward, this brings about a relative elevation of the bearing part 10 by a3=1.2 mm to the transfer module 5. As the bearing part 10 abuts against the fastening wall 11' of the safe 3 in the installation position, this results in the spacing between the transfer module 5 and the safe 3 being reduced by a3=1.2 mm compared to a position of rotation of the adjusting bolt 14 in which the adjusting contour 22 of the adjusting bolt 14 is arranged at the top, see FIGS. 5a and 5b. The horizontal plane H specifies the fastening height of the bearing part 10 on the second module 3, with respect to which the adjusting direction J extends in a perpendicular manner.

So that the transfer module 5 is securable on the bearing part 10, serving as an adapter, in each adjusting position of the adjusting bolt 14, the housing wall 6 of the transfer module 5 comprises in the end regions 9 in each case an elongated hole 23 and a longitudinal groove 24 which are arranged oriented in the adjusting direction J, that is in the vertical direction. A screw 25 is able to engage in each case through the elongated hole 23 and the longitudinal groove 24 and is able to secure the transfer module 5 to the bearing part 10 by forming a threaded engagement with a bore of the adjacent bearing part 10.

So that the adjusting bolt 14 is able to be modified in its position of rotation after ascertaining an inadmissibly large spacing between the safe 3 and the transfer module 5, the transfer module 5 is displaced out of its operating position relative to the positionally fixed safe 3 into a non-operating position. To this end, the transfer module 5 is mounted by means of rails (not shown) with respect to the safe 3. In the operating position of the transfer module 5, notes of pecuniary value can be paid in and/or out at the automatic teller machine. In the non-operating position of the transfer module 5, the transfer module 5 can be removed from the safe 3. To this end, the transfer module 5 is displaced in its longitudinal direction relative to the fastening wall 11 by disengaging a locking means, is moved downward until it is supported on a bottom fastening wall 26, is then rotated about a horizontal axis which extends in an end region 9 of the transfer module 5 and is removed upward from the safe 3.

In a further step, the fastening means which releasably connect the transfer module 5 to the bearing part 10 are then released. In the present exemplary embodiment, screws 25 which engage in the elongated hole 23 or in a longitudinal groove 24 of the transfer module 5 and in bores of the bearing part 10 are provided as fastening means. The elongated hole 23 and the longitudinal groove 24 are arranged oriented in the adjusting direction J. Once the screws 25 have been released or loosened without them leaving the threaded bore of the bearing part 2, a latching element 30, which in its locking position engages behind the adjusting bolt 14 in the transverse direction by engaging in a latching trough 31 and secures said latching bolt in the axial direction of the bearing part 10, is unlocked. The adjusting bolt 14 can then be removed in its axial direction from the bearing part 10 or the transfer module 5.

The adjusting bolt 14 is then rotated about its axis A such that an elevation flank 21, 21', 21" of such a height is arranged at the top in the vertical direction that, with the adjusting bolt 14 in the inserted state, the bearing part 10 is displaced so far downward relative to the transfer module 5 in the vertical direction that the current spacing set as a result is smaller than a predefined maximum spacing. The top longitudinal side 20 of the adjusting bolt 14 in the first circumferential region 18 which abuts against the top opening edge 16' of the opening 16 of the transfer module 5 serves as a reference.

The relative height setting currently set between the transfer module 5 and the bearing part 10 can be recognized by a coding which is mounted on the end face 17 of the adjusting bolt 14. For this purpose, the end face 17 comprises as indicating elements differently large notches 32, 32', 32", 32''' associated in each case with the longitudinal sides 20. If one longitudinal side does not have any notch associated therewith, there is a zero elevation. A small notch 32' corresponds to an elevation by a1=0.4 mm, a median notch 32" to an elevation by a2=0.8 mm and a large notch 32''' to an elevation by a3=1.2 mm.

Once the adjusting bolt 14 has been inserted in the correct position engaging into the openings 15, 16, the latching elements 30 engage into the latching trough 31 again. The end faces 17 of the adjusting bolt 14 preferably close off flush with an outside surface of the housing wall 6 of the transfer module 5. Finally, the screws 25 are tightened such that the transfer module 5, which is connected to the bearing part 10, can be mounted on the safe 3 again.

Figure 8A:
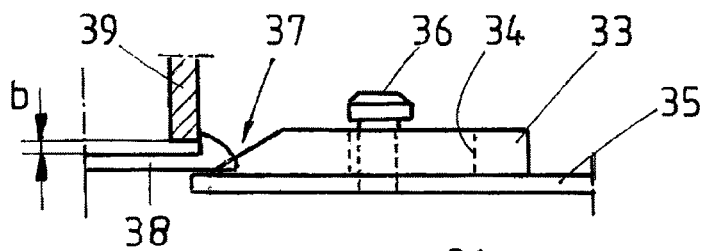
FIG. 8a shows an enlarged representation of a displacement element of the transfer module in a position prior to fixing a latching element of the bearing part onto a fastening wall.
Figure 8B:
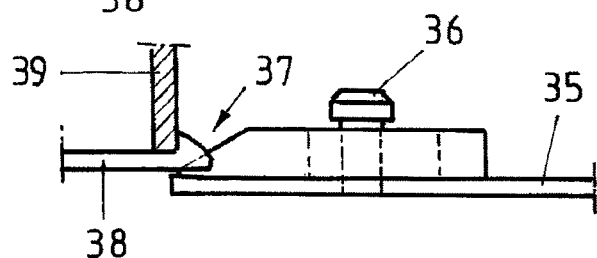
FIG. 8b shows an enlarged representation of the displacement element of the transfer module with the bearing part in the mounting position on a fastening wall.

If the transfer module 5 is situated in the mounting position on the safe 3, it is secured on the safe 3 in the mounting position by means of a displacement element 33 which extends in a tapering manner. The displacement element 33 comprises an elongated hole 34 in which is guided a screw 36 which is situated in screw engagement, in threaded engagement with a horizontal housing wall 35 of the transfer module 5. The displacement element 33 comprises a wedge-shaped end 37 which, for locking the transfer module 5 on the safe 3, engages behind a barb-shaped latching element 38 of the bearing part 10 and presses it against a framework part 39 of the safe 3, which is arranged in a positionally fixed manner. The locking position of the displacement element 33 shown in FIG. 8b is secured by tightening the screw 36 such that the displacement element 33 is secured in the locking position. The latching element 38 is preferably arranged so as to be movable by a vertical distance b=0.5 mm.

According to an alternative embodiment of the invention, instead of a rigidly realized adjusting bolt 14, it is possible to provide an adjusting bolt 44 with a flexible end 45, said bolt interacting with a longitudinal recess 43 of the vertically extending housing wall 6 of the transfer module 5 which comprises an adjusting contouring 46. The same components or component functions of the two exemplary embodiments are provided with the same reference numerals.

Figure 9:
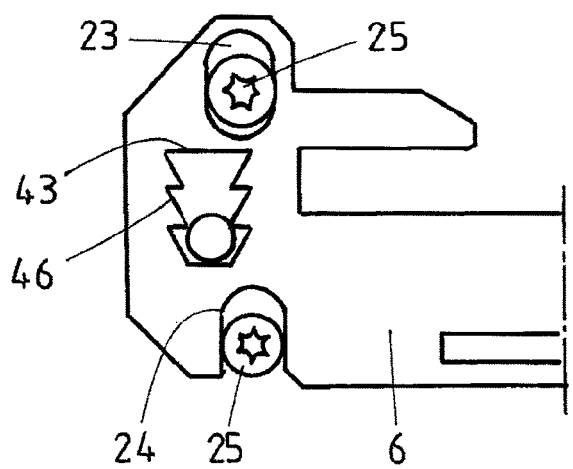
FIG. 9 shows a part view in the end region of a transfer module according to a second embodiment.
Figure 10:
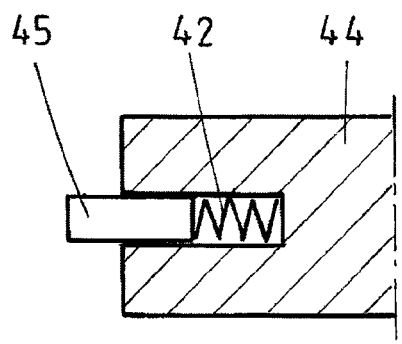
FIG. 10 shows a part section through an adjusting bolt according to the second embodiment.

The longitudinal recess 43 of the transfer module 5 comprises fir-shaped adjusting contours 46 which enable a stepped locking bearing arrangement of the ends 45 of the adjusting bolt 44. If the bearing part 10 with the adjusting bolt 44 is situated in the installation position shown in FIG. 9, as a result of a vertical force cooperating with the transfer module 5 or the housing wall 6 of the same in a downward manner, the transfer module 5 can be moved downward relative to the bearing part 10 corresponding to the latching steps which are predefined by the adjusting contouring 46. A relative vertical adjustment of the transfer module 5 to the safe 3 can be effected in this way in a simple handling manner as a result of such a latching means—without removing the adjusting bolt 44 from the transfer module 5 or the bearing part 10.

The ends 45 of the adjusting bolt 44 are resiliently mounted in the axial direction such that by applying an axial force the ends 45 are able to be moved toward one another such that the adjusting bolt 44 is able to be inserted between the opposite housing walls 6 of the transfer module 5 and the end faces 41 of the bearing part 10, until the ends 45 are arranged in alignment with the openings 15, 16 of the transfer module 5 or of the bearing part 10. The ends 45 can then engage in the openings 15, 16 automatically as a result of the spring force 42 and have then reached the locking position. The length of the resiliently realized ends 45 is at least as long as the thickness of the housing wall 6 of the transfer module 5 and of the end face 41 of the bearing part 10.

A motor for driving conveying shafts for the notes of pecuniary value is preferably provided in the transfer module 5, said conveying shafts being arranged in said transfer module.

As an alternative to this, the adjusting direction J can also extend in the horizontal direction or in another direction. To this end, the transfer modules 5 and the bearing means 10 would have to be mounted oriented correspondingly in another manner.

What is claimed is:

1. An apparatus for adjusting an installation position of modules in a self-service device, the apparatus comprising:
    a first module;
    a second module;
    a transfer module with a transfer slot for transferring notes of pecuniary value from the first module to the second module or vice versa, the transfer module being held in an operating position by at least one fastener and forms a spacing to the second module; and
    adjusting means (14; 43, 44) associated with the transfer module (5) for adjusting a spacing between the transfer module (5) and the second module (3) in an adjusting direction (J) that extends perpendicularly with respect to the transfer slot (7) and in a transfer plane of the notes of pecuniary value that is predefined by the transfer slot (7) to form different spacings ($a_1$, $a_2$, $a_3$) between the transfer module (5) the second module (3), wherein the adjusting means (14; 43, 44) are arranged in a region of the transfer module (5) in which the transfer module (5) is releasably coupled with the second module (3) by a bearing (10).

2. The apparatus of claim 1, wherein:
    the bearing (10) comprises a barb-shaped latching element (38) to lock the transfer module (5) in the operating position, and
    the transfer module (5) comprises a displacement element (33) with a tapering end (37), and
    wherein the barb-shaped latching element (38) is held in a clamping manner on a framework part (39) of the second module (3) by engaging behind said framework part by means of the tapering displacement element (33).

3. The apparatus of claim 1, wherein the adjusting means (14; 43, 44) is configured so that the transfer module (5) is mounted so as to be adjustable in a stepped manner in the adjusting direction (J).

4. The apparatus of claim 1, wherein the transfer module (5) extends in a bar-shaped manner transversely with respect to the adjusting direction (J) and the transfer slot (7) of the transfer module (5) has associated therewith guide means (8) for guiding the notes of pecuniary value when they are transferred from the first module (2) to the second module (3) or vice versa.

5. An apparatus for adjusting an installation position of modules in a self-service device, the apparatus comprising:
    a first module;
    a second module;
    a transfer module with a transfer slot for transferring notes of pecuniary value from the first module to the second module or vice versa, the transfer module being held in an operating position by at least one fastener and forms a spacing to the second module; and
    adjusting means (14; 43, 44) associated with the transfer module (5) for adjusting a spacing between the transfer module (5) and the second module (3) in an adjusting direction (J) that extends perpendicularly with respect to the transfer slot (7) and in a transfer plane of the notes of pecuniary value that is predefined by the transfer slot (7) to form different spacings ($a_1$, $a_2$, $a_3$) between the transfer module (5) the second module (3), the adjusting means comprises:
    an adjusting bolt (14, 44),
    a recess (15, 16, 43) of the transfer module (5) and/or of a bearing (10), and
    an adjusting contouring (22, 46) on the adjusting bolt (14) and/or the recess (43) so that, in dependence on a relative position of the adjusting bolt (14, 44) to the recess (15, 16, 43), the transfer module (5) is adjustable in the adjusting direction (J) relative to the second module (3) and/or to the first module (2).

6. The apparatus of claim 5, wherein the transfer module (5) has a housing wall (6) that extends perpendicularly to the adjusting bolt (14), the housing wall (6) having an elongated hole (23) extending in the adjusting direction (J) and/or a longitudinal groove (24) such that in cooperation with a fastening bolt (25) the transfer module (5) is fastenable to the bearing (10) so as to be displaceable in the adjusting direction (7).

7. The apparatus of claim 5, wherein the adjusting means (14; 43, 44) are arranged in a region of the transfer module (5) in which the transfer module (5) is releasably coupled with the second module (3) by a bearing (10).

8. The apparatus of claim 7, wherein the bearing (10) comprises a latching element (30) that acts upon the adjusting bolt (14) to generate a clamping force that is directed transversely with respect to the axis (A) of the adjusting bolt (14).

9. The apparatus of claim 5, wherein the transfer module (5) has
a housing wall (6) with an opening (16) and one end (17, 45) of the adjusting bolt (14, 44) is mounted so as to be insertable into said opening,
the adjusting bolt (14) comprising adjusting contours (22, 22', 22", 22''') that are distributed in the circumferential direction and are arranged at a different radial spacing to an axis (A) of the adjusting bolt (14) so that, in dependence on a position of rotation of the adjusting bolt (14) relative to the transfer module (5), said transfer module is movable into a different adjusting position relative to the second module (3) and/or to the first module (2).

10. The apparatus of claim 9, wherein the adjusting contours (22, 22', 22", 22''') are arranged in a second circumferential portion (19) of the adjusting bolt (14) which corresponds to an opening (15) of the bearing (10), the adjusting contours (22, 22', 22", 22''') are formed by elevation flanks (21, 21', 21") of different elevation to contours (20) of the adjusting bolt (14) in a first circumferential portion (18) of the adjusting bolt (14) that corresponds to the opening (16) of the housing wall (6).

11. The apparatus of claim 10, wherein the adjusting direction (J) extends in a vertical direction and in that the adjustable spacing ($a_1, a_2, a_3$) is predefined by a vertical offset of the elevation flank (21, 21', 21", 21''') located in the second circumferential region (19) to the contour (20) of the adjusting bolt (14) in the first circumferential region (18), wherein in each case the elevation flank (21, 21', 21") associated with a top opening edge (15') of the bearing means (10) is active.

12. The apparatus of claim 9, wherein an end face (17) the adjusting bolt (14) comprises indicating elements (32, 32', 32", 32''') for designating the different adjusting contourings (22, 22', 22", 22''') of the adjusting bolt (14).

13. The apparatus of claim 5, wherein the recess (43) of the transfer module (5) comprises a multitude of adjusting contours (46) that extend in the adjusting direction (J) such that as a result of relative displacement of the transfer module (5) to the bearing means (10) in the adjusting direction (J), the adjusting position of the transfer module (5) with respect to the second module (3) is adjustable.

14. The apparatus of claim 13, wherein the recess (43) is a fir-shaped longitudinal recess (43) and the adjusting bolt (44) is mounted by way of its end (45) in a latching manner in the longitudinal recess (43).

15. The apparatus of claim 13, wherein the end (45) of the adjusting bolt (44) is resiliently mounted in the axial direction (A) of the adjusting bolt (44).

16. A method for adjusting an installation position of modules in a self-service device, the method comprising:
providing a transfer module for transferring notes of pecuniary value from a first module to a second module of a self-service device or vice versa,
using an adjusting means (14; 43, 44) for adjusting, in an adjusting direction (J), a relative spacing between the transfer module (5) and the first module (2) and/or a bearing (10) that is connectable in a positionally fixed manner to the second module (3) so that a spacing ($a_1, a_2, a_3$) between the transfer module (5) in its installation position and the first module (2) and/or the second module (3) is smaller than a predefined maximum spacing,
wherein adjusting the spacing ($a_1, a_2, a_3$) between the transfer module (5) and the second module (2) in the installation position is effected as a result of displacing the transfer module (5) in the adjusting direction (J) in a linear manner relative to the second module (3), and
wherein the adjusting means (44), which is coupled with the second module (3) is adjusted in a stepped manner in a latching recess (43) of the transfer module (5) that extends in the adjusting direction (J).

17. The method of claim 16, wherein the relative spacing between the transfer module (5) and the bearing (10) is adjusted in dependence on a position of rotation of the adjusting means (14), wherein in the circumferential direction the adjusting means (14) comprises differently elevated adjusting contours (22, 22', 22", 22''') that act on the bearing (10) in terms of a relative movement in the adjusting direction (J) to the transfer module (5).

* * * * *